Sept. 8, 1970  H. J. HAVLICEK  3,527,987
MONITOR CIRCUIT FOR DETECTING THE OCCURRENCE OF ONE
OR MORE OF A PLURALITY OF EVENTS IN A SYSTEM
Filed Oct. 23, 1967

INVENTOR.
HENRY J. HAVLICEK

BY *Edward N. Loebel*

HIS ATTORNEY

United States Patent Office 3,527,987
Patented Sept. 8, 1970

3,527,987
MONITOR CIRCUIT FOR DETECTING THE OCCURRENCE OF ONE OR MORE OF A PLURALITY OF EVENTS IN A SYSTEM
Henry J. Havlicek, Erie, Pa., assignor to General Electric Company, a corporation of New York
Filed Oct. 23, 1967, Ser. No. 677,304
Int. Cl. H02h 7/00; G08b 19/00
U.S. Cl. 317—33                                    5 Claims

ABSTRACT OF THE DISCLOSURE

A fault monitoring circuit in which a plurality of thyristors, such as SCR's, is used to detect a similar plurality of faults and to provide a preselected output at the occurrence of any fault. Each of the thyristors has a light in its load circuit to indicate which fault has occurred. A normally energized relay is deenergized when any one of the thyristors is conducting, thereby providing the preselected output as the energizing current acts as holding current for the thyristor.

BACKGROUND OF THE INVENTION

This invention relates to a circuit for monitoring the occurrence of an event, and more particularly, a circuit for responding to the occurrence of any of a plurality of events.

While not limited to any single use, this invention is particularly useful for monitoring the occurrence of faults in one or more motor control systems. For example, some means are often required for responding to the occurrence of such faults as the failure of a fuse which protects a motor armature, overheating the motor, the occurrence of a very high transient motor current, etc., to take some preselected course of action, such as disconnecting the system from a power source. Where more than one motor control system is used for an industrial process, it is often desirable to shut down all of the systems if a fault occurs in one of them.

Fault monitoring circuits themselves should be fast acting, as well as inexpensive to manufacture. It is often preferable that they have a fail-safe mode of operation so that a failure in the monitor circuit itself either does not prevent the circuit from responding to a fault or operates as if a fault had occurred.

Therefore, it is an object of this invention to provide an improved circuit for monitoring the occurrence of any of a plurality of events and providing a single, preselected output upon such an occurrence.

It is another object of this invention to provide an inexpensive, fast acting fault monitoring circuit for indicating which of a possible plurality of faults has occurred and providing a single output upon the occurrence of any of the faults.

SUMMARY OF INVENTION

Briefly stated, and in accordance with one aspect of this invention, a monitoring circuit comprises a plurality of thyristors for detecting the occurrence of a corresponding plurality of events in a system being monitored. A load circuit of each of the thyristors includes means for indicating that a particular fault has occurred, while a normally energized device or circuit is deenergized by the thyristors in response to the occurrence of any fault to provide a preselected output.

The specification concludes with claims particularly pointing out and distinctly claiming the subject matter of this invention. The organization and manner and process of making and using this invention, together with further objects and advantages thereof, may be best understood by referring to the following description taken in conjunction with the accompanying drawings.

SPECIFICATION

Figure 1:
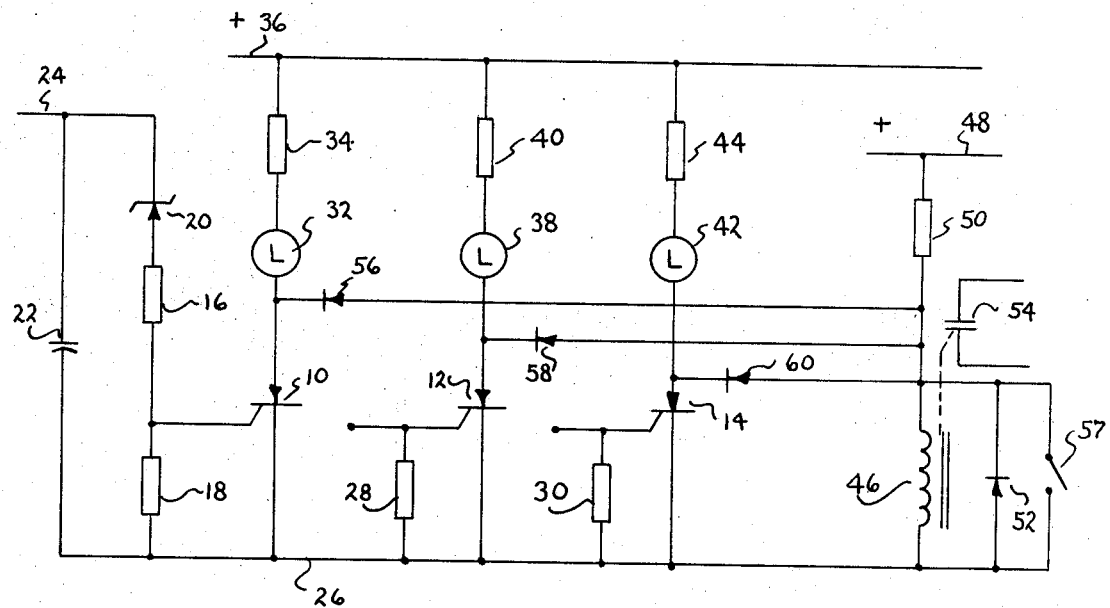
FIG. 1 is a schematic diagram of one embodiment of a monitoring circuit made in accordance with this invention.

Referring now in more detail to the drawings, FIG. 1 shows a monitoring circuit wherein a plurality of thyristors detect the occurrence of a number of events in a system, such as the motor control system referred to above. Upon the firing of one of these thyristors, the occurrence of this particular event is indicated and a preselected output is provided. As used throughout this specification and in the appended claims, "thyristor" means any semi-conductor switch whose bi-stable action depends on regenerative feedback. Thyristors can be two, three or four terminal devices, and both unidirectional and bidirectional in nature. A common example of thyristors is a silicon controlled rectifier (SCR).

More specifically, FIG. 1 includes thyristors 10, 12, and 14, each of which has a gate circuit for responding to the occurrence of an event, such as the occurrence of a fault in a control system. For the sake of simplicity, only the gate circuit of the thyristor 10 is shown in any detail. This gate circuit includes a voltage divider comprising resistors 16 and 18, a breakdown voltage device such as a Zener diode 20, and a filter capacitor 22. A conductor 24 leads from a transformer circuit which responds to the failure of one or more fuses in the power circuit of a motor control system using controlled rectifiers, such as thyristors, for supplying energy from an alternating-current source to the armature of a direct-current motor. Current flows through the conductor 24, through the Zener diode 20 and the resistor 16 to the gate electrode of the SCR 10. The resistor 18 is connected from this gate electrode to a common line 26 for the circuit. The filter capacitor 22 is connected across the Zener diode 20 and the resistors 16 and 18.

Resistors 28 and 30, connected between the gate electrodes of the thyristors 12 and 14, respectively, and the common line 26, correspond to the resistor 18. By providing appropriate input circuitry, the thyristors 12 and 14, and any additional thyristors which may be needed, can be adapted to monitor the presence or absence of a voltage, the finite magnitude of an input voltage, or a more elaborate function such as the phase sequence of a three-phase voltage supply.

Each of the thyristors has a load circuit which includes means responsive to the firing of an individual thyristor to mark the occurrence of a particular event, such as a fault. Thus, the anode electrode of the thyristor 10 is connected through a load circuit comprising an indicating lamp 32 and a resistor 34 to a source of positive voltage 36. Similarly, the anode of the thyristor 12 is connected through an indicating lamp 38 and a resistor 40 to the voltage source 36, and the anode electrode of the thyristor 14 is connected through an indicating lamp 42 and a resistor 44 to the same source.

In accordance with this invention, the monitoring circuit includes a normally energized circuit component 46, which upon deenergization, provides a preselected output from the monitoring circuit. The current which had energized the circuit component 46 is the holding current for a fired thyristor. In the present embodiment of this invention, this circuit component comprises a relay coil which is normally energized by current flowing from a positive potential voltage source 48 and through a resistor 50. A free-wheeling diode 52 is connected across the relay coil 46.

Where the monitoring circuit is detecting the occurrence of faults in a control system, contacts 54 of the relay 46, which are closed while the relay is energized, can be used to disconnect the system from a voltage supply.

Means are provided for interconnecting the normally energized relay coil 46 with the load circuit of each of the thyristors. These means comprise diodes 56, 58, and 60, having their cathodes connected to the anode of the thyristors 10, 12, and 14, and their anodes connected to one side of the relay coil 46. The potential of the voltage source 36 is much higher than that of the voltage source 48. Thus, while the thyristors 10, 12 and 14 are non-conducting, the diodes 56, 58, and 60 isolate the load circuits of the thyristors from the circuit which is energizing the relay coil 46. When any one of the thyristors is conducting, shunting its holding current from the relay 46, the diodes connected to the other thyristors isolate the non-conducting thyristors from the shunted relay coil 46 and thus from the conducting thyristor.

A normally opened switch 57 is connected across the relay coil 46 to act as a reset device for the monitoring circuit. Any of the thyristors 10, 12, and 14 which may be conducting, can be returned to the non-conducting state by momentarily closing the switch 57, thereby shunting the holding current away from this conducting thyristor.

OPERATION OF FIG. 1

The operation of the monitor circuit shown in FIG. 1, can be best understood by assuming that a signal is received at the conductor 24, signifying that a fuse has blown in a control system. When the signal increases beyond the breakdown level of the Zener diode 20, the thyristor 10 is fired. Current then flows through the resistor 34 and the indicating lamp 32 to signify that a fuse has blown.

Up until this time, current had been flowing through the resistor 50 to energize the relay coil 46. However, when the thyristor 10 is fired, the diode 56 is forward biased, causing a majority of the current from the voltage source 48 to flow through this diode and the thyristor 10. This current flowing through the resistor 50 is the holding current which keeps the thyristor 10 conducting, the current flowing through the resistor 34 and the indicating lamp 32 alone being insufficient for this purpose.

At this time, the voltage across the relay coil 46 is the voltage drop across the diode 56 and thyristor 10, this voltage drop being below the activation level of the relay coil 46 so that this relay is effectively deenergized. The relay contacts 54, which would have been closed while the relay coil 46 was energized, are now opened due to the deenergization of this relay.

To reset the monitor circuit the switch 57 is closed momentarily, shunting the holding current from the diode 56 and the thyristor 10. Since the current flowing from the voltage source 36 is insufficient to keep the thyristor 10 turned on, it stops conducting. When the switch is released the current from the voltage source 48 flows through the relay coil 46 once again, energizing this relay and causing the contacts 54 to be closed. The monitor circuit is ready to respond once again to any of the faults which it is sensing.

Figure 2:
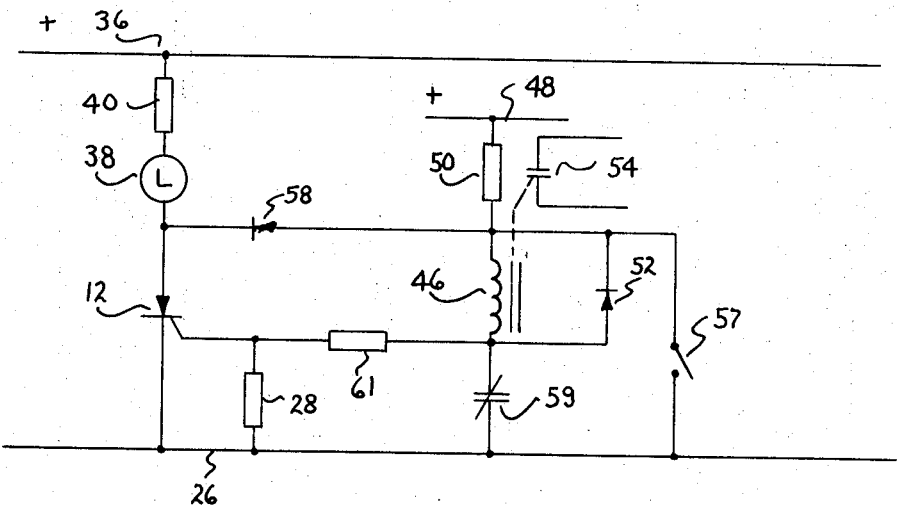
FIG. 2 shows a portion of a second embodiment of this invention.

FIG. 2 is another embodiment of this invention which shows one of the thyristors, the thyristor 12, connected in a circuit which allows it to monitor the opening of a normally closed contact 59. Similar circuit components in FIGS. 1 and 2 have been given the same numerals.

The normally closed contacts 59 are connected between the common line 26 and a terminal of the relay coil 46. This terminal is connected through a current limiting resistor 61 to the gate electrode of the thyristor 12.

When the contacts 59 are closed, current flowing through them shorts out the gate circuit of the thyristor 12. However, when these contacts 59 open, current flows through the resistors 61 and 28 to turn on the thyristor 12. At this time, current flows through the diode 58, a resistor 50 and the thyristor 12, providing holding current for this thyristor which enables the relay 46 to be deenergized as explained above.

This invention is not limited to the particular details of the preferred embodiments illustrated. It is contemplated that many variations, modifications, and applications of this invention will occur to those skilled in the art. It is therefore intended that the appended claims cover those variations, modifications and applications which do not depart from the true spirit and scope of this invention.

What I claim as new and desire to secure by Letters Patent of the United States is:

1. A monitoring circuit for detecting the occurrence of one or more of a plurality of possible events which might occur in a system, indicating which of the events has occurred, and providing one preselected output at the occurrence of the first of any of the events, comprising, in combination:
    (a) a plurality of thyristors corresponding to the plurality of possible events;
    (b) each of said thyristors having a gate circuit responsive to the occurrence of the event which it monitors for providing firing signals to said thyristor;
    (c) each of said thyristors having a load circuit including means actuated in response to the firing of said thyristor for indicating that a particular event has occurred;
    (d) normally energized circuit means which, upon deenergization, provides the preselected output; and,
    (e) coupling means interconnecting said normally energized circuit means with said load circuit of each of said thyristors for causing the firing of any of said thyristors to deenergize said circuit means, said coupling means causing a holding current to flow through a fired thyristor and isolating said load circuit of each of the non-conducting of said thyristors from said circuit means and from said fired thyristor while said circuit means is deenergized.

2. A monitoring circuit according to claim 1 wherein said coupling means comprises the corresponding plurality of rectifiers, each of which is connected between said normally energized circuit means and one of said load circuits.

3. A fault monitoring circuit for detecting the occurrence of one or more of a plurality of faults which might occur in a system, indicating which of the faults has occurred, and providing one preselected output at the occurrence of the first of any of the faults, comprising, in combination:
    (a) a plurality of thyristors corresponding to the plurality of possible faults;
    (b) each of said thyristors having a gate circuit responsive to the occurrence of the fault which it monitors for providing firing signals to said thyristors;
    (c) each of said thyristors having a load circuit including means energized by current which flows through a thyristor from a first source of voltage in response to the firing of said thyristor for indicating that a particular fault has occurred, this current flow being insufficient to keep said thyristor conducting;
    (d) circuit means normally energized by a second source of voltage having a voltage level which is less than the voltage level of the first source, said circuit means providing the preselected output upon its deenergization; and
    (e) coupling means interconnecting said circuit means with said load circuit of each of said thyristors for causing the firing of one of said thyristors to deenergize said circuit means by switching current from said circuit means to the fired thyristor to provide holding current for the fired thyristor, said coupling means isolating the circuit of each of the non-conducting of said thyristors from said circuit means and from any fired thyristor while said circuit means is non-conducting.

4. A monitoring circuit according to claim 3 wherein said coupling means comprises the corresponding plurality of rectifiers, each of which is connected between said normally energized circuit means and one of said load circuits.

5. A monitoring circuit according to claim 3 which includes a reset switch connected across said circuit means for shunting the holding current from a conducting thyristor.

References Cited

UNITED STATES PATENTS

| 3,147,464 | 9/1964 | Spielman | 340—415 |
| 3,244,937 | 4/1966 | Blackburn | 317—27 XR |
| 3,314,001 | 4/1967 | Brockman. | |
| 3,343,036 | 9/1967 | Steen. | |
| 3,360,685 | 12/1967 | Wooldridge | 317—16 |

LEE T. HIX, Primary Examiner

U.S. Cl. X.R.

317—148.5; 340—248, 253, 415